May 2, 1961 R. R. DAHL 2,982,475
THERMOSTATIC MIXING VALVE
Filed April 3, 1958 2 Sheets-Sheet 1
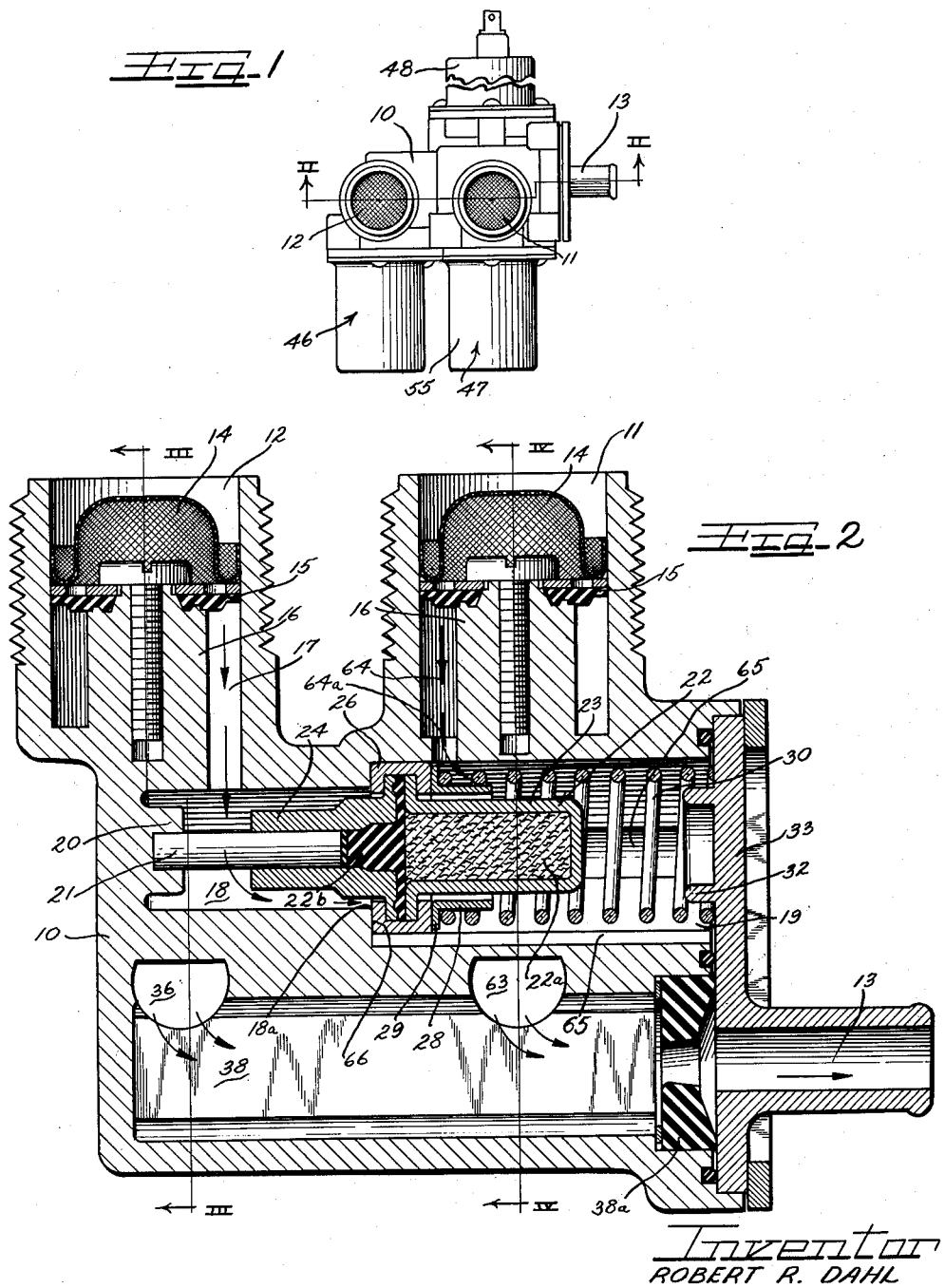
Inventor
ROBERT R. DAHL

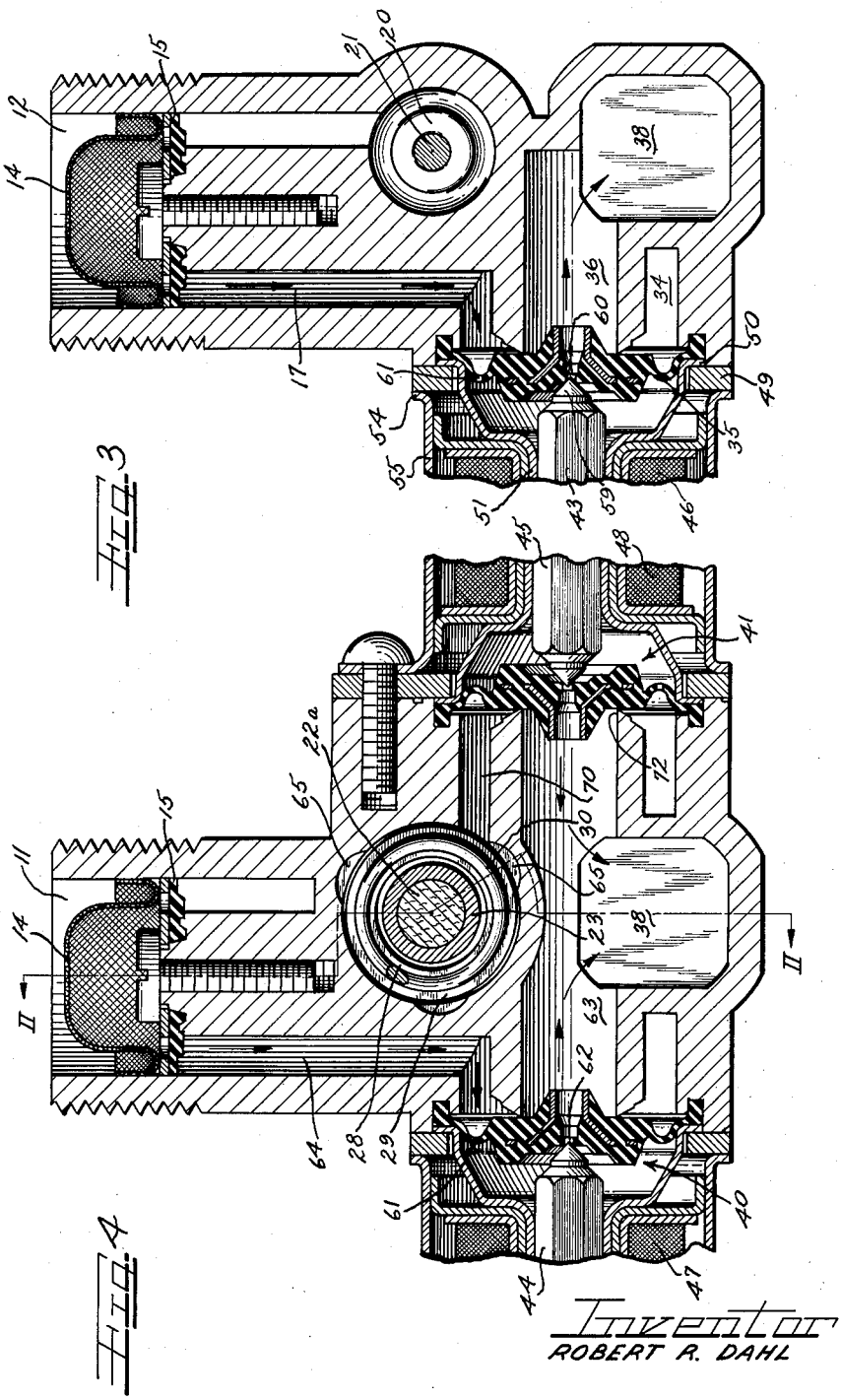

2,982,475

THERMOSTATIC MIXING VALVE

Robert R. Dahl, Lincolnwood, Ill., assignor to The Dole Valve Company, Morton Grove, Ill., a corporation of Illinois Filed Apr. 3, 1958, Ser. No. 726,271

1 Claim. (Cl. 236—12)

This invention relates to improvements in thermostatically controlled fluid mixing valves and more particularly to a device arranged to deliver water at various temperatures between the temperature of the cold and the hot water entering the valve.

It is a further object of this invention to provide a solenoid controlled fluid mixing valve particularly adapted for combined washing and drying machines and the like for supplying hot or temperate water for clothes washing and rinsing purposes and cold water for condensing the moisture removed from the clothes during the drying operation.

A still further object of this invention is to provide an efficient form of fluid mixing valve having a central mixing chamber with hot and cold water inlets leading into the mixing chamber in which water is metered thereinto by a thermostatically controlled valve element and in which the mixing valve has a single outlet passageway, and in which three independently operated solenoid control valves control the flow of water to the outlet, one controlling the discharge of tempered water from the mixing chamber, a second controlling the by-pass of hot water from the hot water inlet around the mixing chamber for direct discharge through the outlet or for mixture with the tempered water, and a third controlling the by-pass of cold water from the cold water inlet around the mixing chamber for direct discharge through the outlet or for mixture with the tempered water.

It is a still further and principal object of this invention to provide a thermostatically controlled fluid mixing valve in which the thermally responsive actuating unit itself acts as the valve for metering hot and cold water to the outlet.

These and other objects of the invention will become apparent from time to time as the following specification proceeds and with reference to the accompanying drawings wherein:

Fig. 1 is a front elevational view of a fluid mixing valve constructed in accordance with the present invention;

Fig. 2 is a horizontal sectional view through the structure illustrated in Fig. 1 showing some parts in section and others in side elevation which is also shown as being taken along lines II—II of Figure 4 to more clearly illustrate the grooves 65;

Fig. 3 is a vertical sectional view taken along lines III—III of Fig. 2; and

Fig. 4 is another vertical sectional view taken along lines IV—IV of Fig. 2.

In the embodiment of the invention illustrated in the drawings there is shown a valve body 10 having hot and cold water inlets 11 and 12, respectively, which are externally threaded to provide a means for connection to a source of fluid. A boss 16 extending upwardly within each of the inlets is radially spaced from the inner walls of the inlet to define a flow passage therearound and serves as a means for securing a filter screen 14 and an annular check valve 15 each of which is well-known in the art and forms no part of the present invention so is not herein described further in detail. A plurality of selectively and automatically actuatable valve members are disposed within the valve body 10 which serve to control fluid flow from the inlets 11, 12 through the valve body in the direction of the arrows to an outlet 13. These various valve members and their operation are hereafter described in detail.

Referring now more particularly to Fig. 2 in the drawings, it will be seen that a cold water flow passage 17 in the cold water inlet communicates directly with a cold water chamber 18 which is formed within the valve body 10 substantially perpendicularly to the inlets and which communicates with a radially enlarged mixing chamber 19 through a port 18a. A boss 20 at the innermost end of the cold water chamber 18 is arranged to receive a thrust pin or piston 21 of a thermally responsive actuating unit 22. The actuating unit is of the well known "solid fill" type in which the thermally expansible material 22a is operable upon certain predetermined ambient temperature conditions about the sensing portion 23, to extensibly move the diaphragm 22b and the thrust pin 21 with respect to the casing 24 of the actuating unit.

It should be noted that a sealing ring 26, generally U shaped in cross section, is provided to seal the several parts of the actuating unit together and for other reasons which will hereinafter become apparent. A cylindrical sleeve 28 having an outwardly turned flanged portion 29 is arranged to fit about the sensing portion 23 of the actuating unit and to guide the inner end portion of a return spring 30. The outermost end of the return spring 30 is guided by a circular boss 32 depending from the end plate 33 in which the outlet 13 is formed.

Referring now more particularly to Fig. 3 of the drawings it may be seen that the flow passageway 17 which is in constant open fluid communication with the cold water inlet opens to the side of the valve body and is closed by a pressure operated solenoid controlled diaphragm valve 35. The diaphragm valve 35 controls the flow of cold water from the annular passageway 17 through a central port 36 concentric with the annular passageway. The central port 36, in turn, is communicable with an outlet chamber 38 which is in constant open fluid communication with the outlet 13 from the valve body. A flow control washer 38a may, if so desired, be positioned at the outlet, as shown, to maintain constant outlet flow.

The pressure operated solenoid controlled diaphragm valve 35, 40 and 41 are independently operable to control the flow of cold, hot, and tempered water respectively through the chamber 38 and the outlet 13. The valves are controlled by armatures 43, 44 and 45 of solenoids 46, 47 and 48 respectively, and are each of the same construction and of a well known form. As a result, the cold water diaphragm valve 35, therefore, need only be described herein.

The diaphragm valve 35 is shown as being retained in sealing engagement with the open end of the valve body 10 at its periphery by a yoke 49 abutting an outer flanged portion 50 of an end cap and guide 51 and pressing said flange into engagement with the outer marginal portion of the diaphragm valve 35. Self-tapping screws (not shown) extending through a flanged portion 54 of a casing 55 for the solenoid, and through the yoke 49 are provided to retain the solenoid and casing to the end of the valve body and to retain the guide 51 in sealing engagement with the marginal portion of the diaphragm valve 35. A spring (not shown) seated within the upper end portion of the guide 51 serves to bias a conical end portion 59 of the armature 43 into engagement with a port 60 leading through the center of the diaphragm valve 35. The diaphragm 35 has a bleeder passageway 61 leading therethrough to pass water from one side of the diaphragm to the other to create a pressure differential on both sides of the diaphragm when the orifice 60 is closed by the conical end portion 59 of the armature 43, and thus to maintain the valve closed by the pressure of the water acting on the outer face thereof. Upon energization of the solenoid 46, the armature 43 will move out of engagement with the central orifice 69 relieving pressure from the outer side of the diaphragm 35 and effecting the opening of the valve by the pressure of fluid on the underside thereof. When the diaphragm valve 35 is opened, upon energization of the solenoid, as previously described, fluid under pressure will flow from the annular passageway 17 through the port 60 and passageways 36, 38, and 13 to supply cold water to a washing machine or like device connected with the outlet, or to supply cold water to mix with the tempered water flowing from the mixing chamber 19 as will hereinafter be described further.

In a like manner, when the solenoid 47 is energized to withdraw the armature 44 from the diaphragm 40, the diaphragm will open and fluid under pressure will pass through the annular passageway 64, through the port 62, and the passageway 63 to the outlet 13.

Referring now more particularly to Figs. 2 and 4 of the drawings, it will be noted that the mixing chamber 19 has a plurality of longitudinally directed grooves 65 along the inner walls thereof which terminate at the annular shoulder 66. Assuming that the valve parts are in the position illustrated in Fig. 2, it will be seen that hot water flowing through the inlet 11 will flow through the flow passageway 64 and into the mixing chamber 19 through the port 64a. The fusible thermally expansible material within the sensing portion 23 of the thermal actuating unit 22 will then expand to extensibly move the body of the actuating unit with respect to the thrust pin 21 and against the force of the return spring 30. Upon movement of the body of the thermal actuating unit away from the shoulder 66 cold water from the cold fluid chamber 18 will be permitted passage through the grooves 65 around the thermal actuating unit and into the mixing chamber 19. In this manner, the water within the mixing chamber 19 will be tempered thus lowering the ambient temperature about the sensing portion 23, the actuating unit 22 so that the body of the actuating unit carrying the sealing ring 26 will again move to seat the ring 26 against the shoulder 66 to close off the port.

Another annular flow passage 70 opens to the opposite side of the valve body from the cold and hot solenoids 46 and 47 and is closed by a third pressure operated solenoid controlled diaphragm valve 41. Similarly, with each of the other valving arrangements the diaphragm valve 41 controls the flow of fluid from the passageway 70 through a central port 72 concentric with the annular flow passageway 70. The central port 72 is communicable with the outlet chamber 38 which is in constant open fluid communication with the outlet 13 from the valve body.

It will be seen that separate energization of the cold, hot, and mix solenoids 46, 47, and 48 will produce cold, hot, or thermostatically controlled mixed water, respectively, at the outlet 13, and that energization of solenoids 46 and 48 together, or 47 and 48 together, will produce water cooler or warmer, respectively, than the thermostatically controlled mixed water produced by energization of solenoid 48 alone, making a total of five different water temperatures available at the outlet. It will also be seen that the thermally responsive element itself controls the flow of both hot and cold water into the mixing chamber.

It will herein be understood, however, that this embodiment of the invention has been used for illustrative purposes only and that various modifications and variations of the present invention may be effected without departing from the novel spirit and scope thereof.

I claim as my invention:

A fluid control valve comprising a housing having hot and cold fluid inlets leading thereinto and an outlet leading therefrom, a chamber communicable with said inlets and said outlet, hot and cold fluid ports opening to said chamber from said hot and cold fluid inlets respectively, a thermal sensitive element having a heat sensing portion and a casing and a piston relatively movable with respect to said casing upon variations in the ambient temperature about said heat sensing portion disposed within said chamber in coaxial alignment with said cold fluid port, said piston abutting a portion of said housing, said hot fluid port opening to said chamber through a side wall of said chamber, said casing including a cup with an outwardly extending flange therearound, a closure with an outwardly extending flange therearound, a resilient diaphragm between said cup and said closure and the flanges thereof, and a ring surrounding and retaining said flanges, said ring being a single unitary element acting as a valve, said ring being slidable along the side wall of said chamber to cover and uncover said port therein, a shoulder defining said cold fluid port, means biasing said casing and an end portion of said ring located adjacent said closure into engagement with said shoulder to shut fluid flow through said cold fluid port in one position of said ring, and passageway means formed within the side wall of said chamber for permitting fluid flow past said casing and said ring from said cold fluid port when said casing and ring thereof is spaced from said shoulder, said ring having a peripheral portion thereof covering said hot fluid port in another position thereof, said ring acting as a valve element in both said positions.

References Cited in the file of this patent

UNITED STATES PATENTS

| | | |
|---|---|---|
| 39,772 | Hoard | Sept. 1, 1863 |
| 1,000,435 | Pagelsen | Aug. 15, 1911 |
| 2,127,059 | Giesler et al. | Aug. 16, 1938 |
| 2,528,422 | Chase | Oct. 31, 1950 |
| 2,584,877 | Hoffman | Feb. 5, 1952 |
| 2,620,134 | Obermaier | Dec. 2, 1952 |
| 2,792,178 | Littleton | May 14, 1957 |
| 2,810,523 | Branson | Oct. 22, 1957 |
| 2,830,765 | Beller | Apr. 15, 1958 |